(12) United States Patent
McLean et al.

(10) Patent No.: US 6,775,384 B2
(45) Date of Patent: Aug. 10, 2004

(54) ENVIRONMENTALLY ROBUST NOISE ATTENUATION SYSTEM

(75) Inventors: Ian R. McLean, Chatham (CA); James K. Vanderveen, Blenheim (CA); Zhouxuan Xia, Windsor (CA)

(73) Assignee: Siemens VDO Automotive Inc., Chatham (CA)

( * ) Notice: Subject to any disclaimer, the term of this patent is extended or adjusted under 35 U.S.C. 154(b) by 353 days.

(21) Appl. No.: 09/931,394

(22) Filed: Aug. 16, 2001

(65) Prior Publication Data

US 2002/0034309 A1 Mar. 21, 2002

Related U.S. Application Data

(60) Provisional application No. 60/234,032, filed on Sep. 20, 2000, and provisional application No. 60/270,769, filed on Feb. 22, 2001.

(51) Int. Cl.[7] .......................... H04B 1/00; G10K 11/16
(52) U.S. Cl. ........................................ 381/71.4; 381/86
(58) Field of Search ........................ 381/71.4, 86, 165

(56) References Cited

U.S. PATENT DOCUMENTS

| | | |
|---|---|---|
| 3,936,606 A | 2/1976 | Wanke |
| 4,410,065 A | 10/1983 | Harvey |
| 4,665,549 A | 5/1987 | Eriksson et al. |
| 4,832,262 A | 5/1989 | Robertson |
| 4,876,722 A | 10/1989 | Dekker et al. |
| 4,896,718 A | 1/1990 | Trin |
| 4,947,434 A | 8/1990 | Ito |
| 5,170,019 A | 12/1992 | Lee |
| 5,197,426 A | 3/1993 | Frangesch et al. |
| 5,229,556 A | 7/1993 | Geddes |
| 5,271,120 A | 12/1993 | Eustache et al. |
| 5,319,165 A | 6/1994 | Geddes |
| 5,336,856 A | 8/1994 | Krider et al. |
| 5,426,703 A | 6/1995 | Hamabe et al. |
| 5,426,705 A | 6/1995 | Yokota et al. |
| 5,432,857 A | 7/1995 | Geddes |
| 5,446,249 A | 8/1995 | Goodman et al. |
| 5,446,790 A | 8/1995 | Tanaka et al. |
| 5,457,749 A | 10/1995 | Cain et al. |
| 5,466,899 A | 11/1995 | Geisenberger |
| 5,513,266 A | 4/1996 | Zuroski |
| 5,541,373 A | 7/1996 | Cheng |
| 5,550,334 A | 8/1996 | Langley |
| 5,587,563 A | 12/1996 | Yazici et al. |
| 5,647,314 A * | 7/1997 | Matsumura et al. ... 123/184.57 |
| 5,693,918 A | 12/1997 | Bremigan et al. |
| 5,828,759 A | 10/1998 | Everingham |
| 5,913,295 A | 6/1999 | Sadr et al. |
| 5,946,763 A | 9/1999 | Egner-Walter et al. |
| 6,009,705 A | 1/2000 | Arnott et al. |
| 6,084,971 A * | 7/2000 | McLean .................... 381/71.5 |
| 6,213,077 B1 | 4/2001 | Horii |

FOREIGN PATENT DOCUMENTS

| | | |
|---|---|---|
| DE | 196 10 292 A1 | 9/1996 |
| EP | 0 884 471 A2 | 12/1998 |
| EP | 0 952 025 A2 | 2/1999 |
| EP | 0 884 471 A3 | 7/1999 |
| JP | 10103173 | 4/1998 |
| JP | 10238427 | 8/1998 |

OTHER PUBLICATIONS

"Acoustic Plant for Active Induction Noise Control"; Research Disclosure, Kenneth Mason Publications, Hampshire, GB, No. 316, Aug. 1, 1990.
International Search Report, dated Jan. 25, 2002.

* cited by examiner

Primary Examiner—F. W. Isen
Assistant Examiner—Elizabeth McChesney

(57) ABSTRACT

The air induction system comprises an air induction body with a mouth and a speaker forming an interface with the mouth. A fender portion of a vehicle at least partially covers the interface, protecting the interface from environmental conditions. A control unit controls with the speaker to thereby generate a noise attenuating sound.

20 Claims, 4 Drawing Sheets

ENVIRONMENTALLY ROBUST NOISE ATTENUATION SYSTEM

This application claims priority to Provisional Patent Application Serial No. 60/234,032 filed on Sep. 20, 2000 and Provisional Patent Application Serial No. 60/270,769 filed on Feb. 22, 2001.

BACKGROUND OF THE INVENTION

This invention relates to a method and system of noise attenuation around an air induction assembly.

Manufacturers have employed active and passive methods to reduce engine noise within the passenger compartment. Such noise frequently emanates from the engine, travels through the air induction system and emanates out of the mouth of the air intake into the passenger compartment. Efforts have been made to reduce the amount of engine noise traveling through the air induction system. These efforts include the use of both passive devices such as expansion chambers and Helmholtz resonators and active devices involving anti-noise generators.

Active systems use a speaker to create a canceling sound that attenuates engine noise. The sound created is out of phase with the engine noise and combines with this noise to result in its reduction. Generally, this sound is generated in proximity to the mouth of the air induction system. In one such system, a control unit, such as a digital signal processor, obtains data from the vehicle engine, creates a predictive model of engine noise, and thereby generates the appropriate cancellation signal based on the results of this model. This signal is then transmitted to the speaker, which transforms this signal into a canceling sound. Because the control unit may not perfectly model engine noise, an error microphone is placed in proximity to the mouth of the air induction system to determine if engine noise need be further attenuated.

Current active noise systems are positioned in the engine compartment of vehicles. The location is hostile, however, to the electric components of these systems. Heat and noise from the engine as well as exposure to environmental road conditions may all affect the durability and performance of such systems. Indeed, even sprayers from car washes may harm components such as speaker and microphone.

A need therefore exists for a more environmentally robust system.

SUMMARY OF THE INVENTION

The present invention protects critical components of the air induction system from the harsh environment of the engine compartment of a vehicle as well as ambient conditions that may exist outside of the vehicle. This objective is accomplished by placing these components in the fender cavity of the vehicle rather than under the hood and within the engine compartment. The inner fender protects the air induction system from the hostile temperatures and conditions around the vehicle engine while the outer fender protects the system from the environment outside of the vehicle.

The invention has at least an air induction body with a mouth and a speaker forming an interface for noise attenuation with the mouth. As known, a control unit determines the speaker output and attenuates noise by generating a sound out of phase with the noise. One embodiment of the invention involves the placement of the interface within the protected confines of a vehicle fender cavity. Portions of the fender thereby protect components such as the speaker and microphone from the elements.

To fit the system within the fender cavity, the speaker may be placed outside of the air induction body rather than in the body as with many other systems. This configuration thereby takes up less space than these other systems. A microphone disposed about the interface serves to provide feedback to the control unit as to whether further attenuation is required. The microphone may be at least partially covered and protected by a portion of the fender. The microphone may be mounted with the speaker as well. Mounting the speaker and microphone together in the fender cavity not only protects both of these components but also enhance noise attenuation by inhibiting the speaker from vibrating relative to the microphone.

A wave guide serves to direct the noise attenuating sound from the speaker to the interface. The wave guide may further serve to cover and protect the speaker in addition to directing the noise attenuating sound. A speaker chamber forms an acoustic mass with the speaker, permitting the speaker to generate low frequency sounds for improved noise attenuation. The speaker chamber may include a venting port.

Another embodiment of the invention involves the formation of a dipole inlet at the interface of noise attenuation. This dipole inlet along with the interface are located within the fender cavity for protection. Additionally, the dipole inlet serves to improve noise attenuation by limiting the amount of sound emanating from the speaker mouth. Again, the speaker may be located outside of the air induction body and may employ a wave guide to direct noise attenuating sound from the speaker to the interface. Wave guide may cover and protect the speaker. A speaker chamber with and without vented port may be employed as well.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

The invention moves delicate electrical components from the engine compartment to the fender cavity of the vehicle. The fender cavity offers protection for these components both from the hostile environment of the engine compartment and the environment outside of the vehicle. The proximity of the fender cavity to the engine compartment ensures that the invention may be implemented without much modification to the vehicle.

Figure 1:
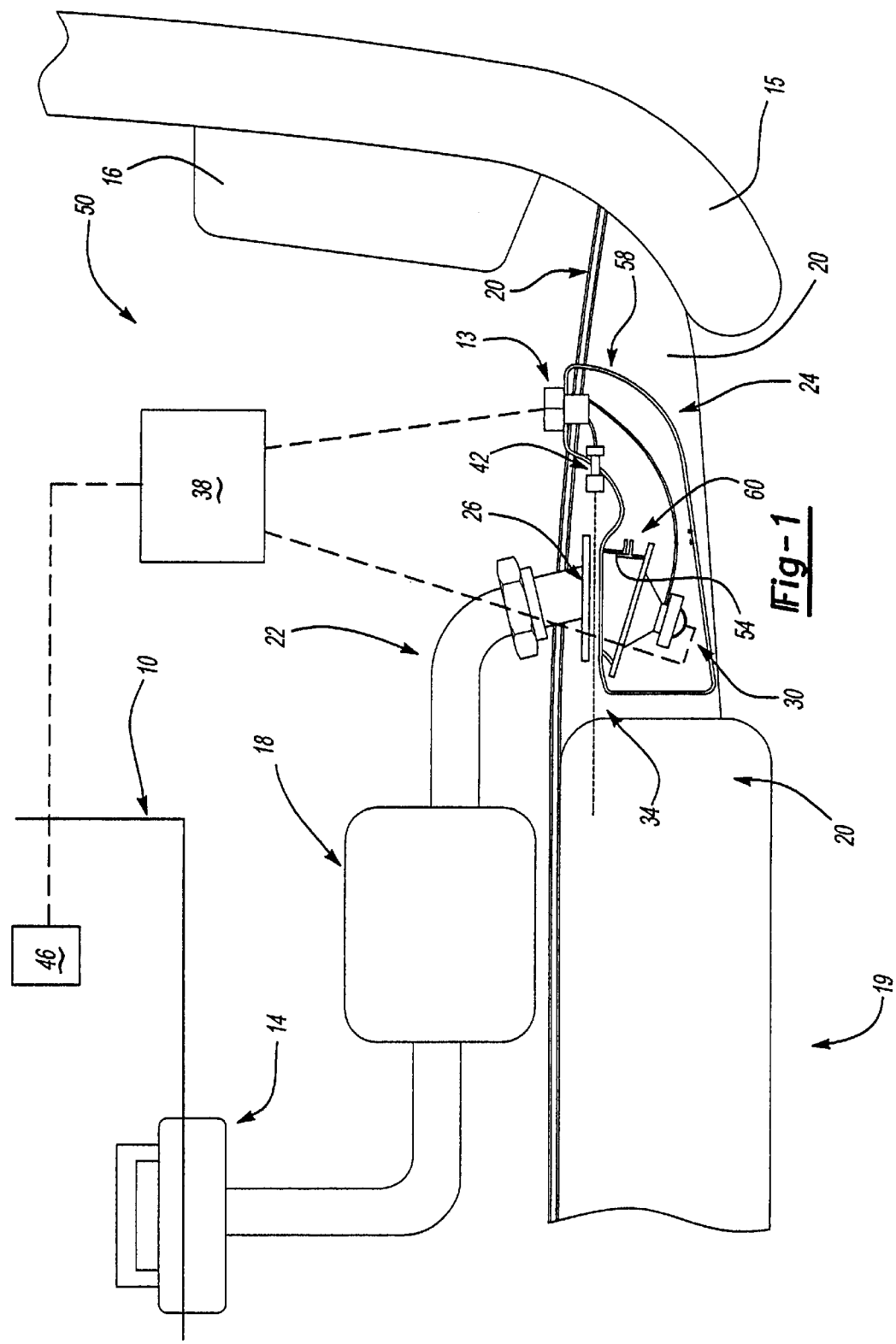
FIG. 1 shows a plan view of an embodiment of the invention, including air induction body, speaker, wave guide, and microphone.

FIG. 1 illustrates an embodiment of the invention. Shown in plan view are vehicle engine 10, throttle body 14, air filter 18, as well as air induction body 22 with mouth 26. Also shown are headlight 16, bumper 15, tire 19, and fender 20. As known, fender cavity 24 exists between bumper 15 and tire 19 within fender 20.

The invention comprises an air induction system including air induction body 22 with a mouth 26. Speaker 30 forms interface 34 with mouth 26 in fender cavity 24, protected by fender 20. At least a portion of fender 20 covers interface 34. Control unit 38 communicates with speaker 30 and also receives input from an error microphone 42. Engine speed sensor 46 also provides information to control unit 38. As known, based on input from engine speed sensor 46 and microphone 42, control unit 38 generates a noise attenuating signal, which is transformed by speaker 30 into a noise attenuating sound. This sound is out of phase with noise from engine and destructively interferes with this noise. As configured, noise attenuation takes place at interface 34. How the noise cancellation is performed may be generally as known. This application focuses on the packaging of the components.

The attenuation of engine noise within fender cavity 24 is a novel feature of the invention. Previously, engine noise attenuation occurred in engine compartment 50. The interface between speaker and mouth of air induction body was generally exposed to heat, vibration, and noise from the engine. Indeed, water, fluids, and small particles from the road could seep their way into the system through the interface.

By moving the location of interface 34 within fender cavity 24, electrical components such as speaker 30 and microphone 42 are environmentally protected by fender 20 while still permitting cold air intake for the induction system. Attenuating noise in this area of the vehicle also helps acoustically isolates microphone 42 from noise emanating from the engine other than at the interface of attenuation. The placement of this interface 34 even permits convenient access to the wiring of these components and allows such wiring to be integrated into a wire harness.

Current active noise attenuation systems generally dispose speaker 30 within the air induction body 22. Disposing speaker 30, however, outside of air induction body 22 reduces the size of the system and permits its location in fender cavity 24. Wave guide 54 may direct noise attenuating sound from speaker 30 to interface 34. As shown, wave guide 54 may cover at least a portion of speaker 30, thereby offering further protection against the environment. Also, wave guide 54 may overlap with mouth 26, further protecting speaker from the environment. Such overlap also creates additional manufacturing tolerance permitting greater control of the location of interface 34.

FIG. 1 also shows microphone 42 mounted with speaker 30, both of which are supported by speaker chamber, a rigid body. The rigid mounting of speaker and microphone together avoids the problem of the microphone vibrating at a different rate than the speaker, which decreases the stability of the system.

Speaker chamber 58 is acoustically coupled to speaker 30. This chamber creates an acoustic mass around speaker 30 that permits speaker to generate low frequency sounds for improved noise attenuation. Speaker chamber 58 may have a venting port 60 to permit some air both in and out of the chamber and may connect by connector 13 to fender 20. One could also integrate speaker chamber 58 with the coolant reservoir and washer fluid reservoir as a modular unit having chamber 58 and a separate reservoir. The proximity of chamber 58 to the reservoir allows for the incorporation of these parts onto a single enabled body. One of ordinary skill in the art would know how to mold these parts to the same body.

Figure 2:
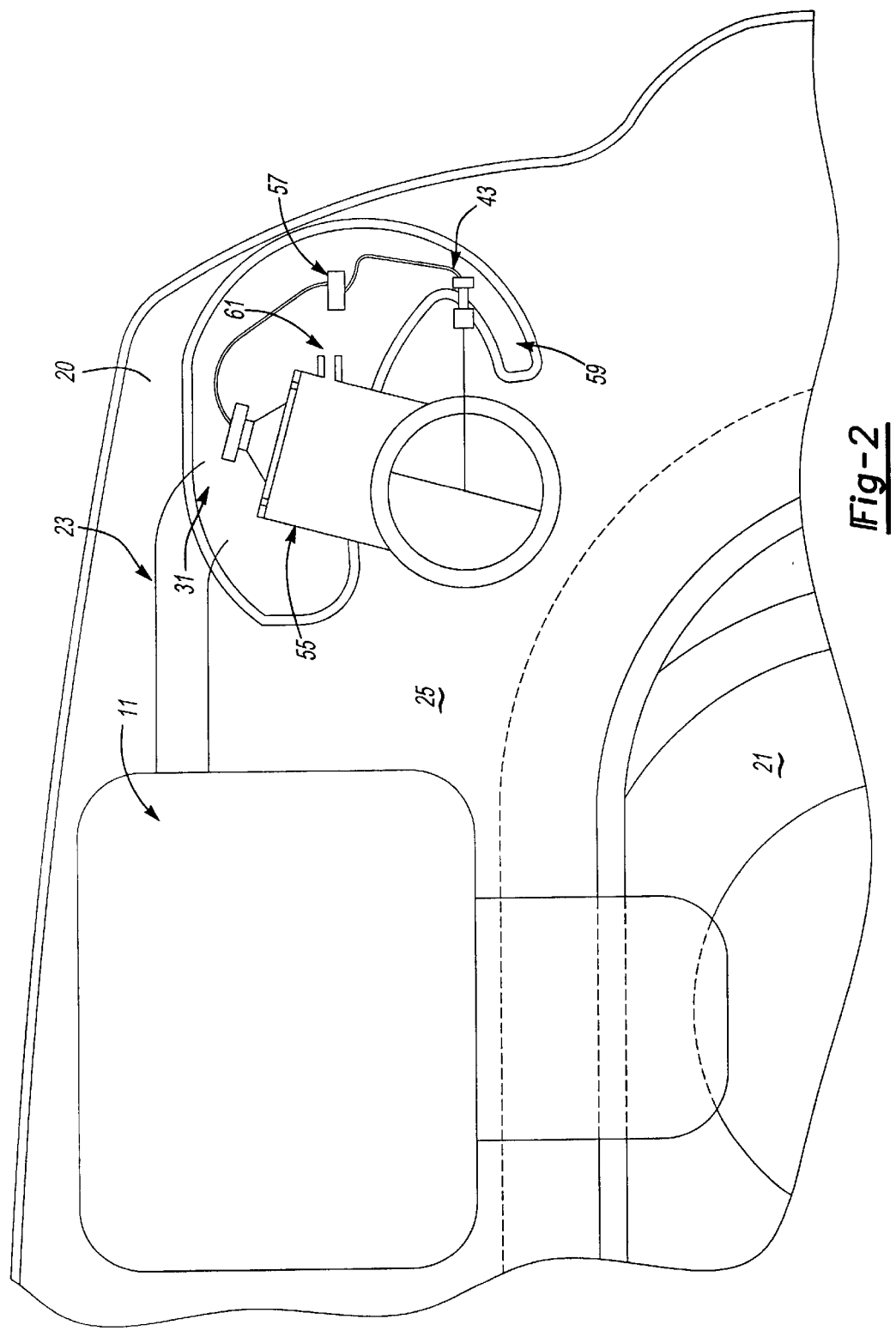
FIG. 2 shows a side view of another embodiment of the invention, including air induction body with wave guide and speaker chamber.

FIG. 2 shows another embodiment of the invention. Shown are engine 11, tire 21, air induction body 23, speaker 31, speaker chamber 59 with venting port 61, wave guide 55, and microphone 43. Connector 57 is also shown, connecting speaker chamber 59 to fender 20. FIG. 2 shows that speaker 31 and microphone 43 as well as other components may be placed within fender cavity 25 above tire 21—a height less prone to hostile road conditions.

Figure 3:
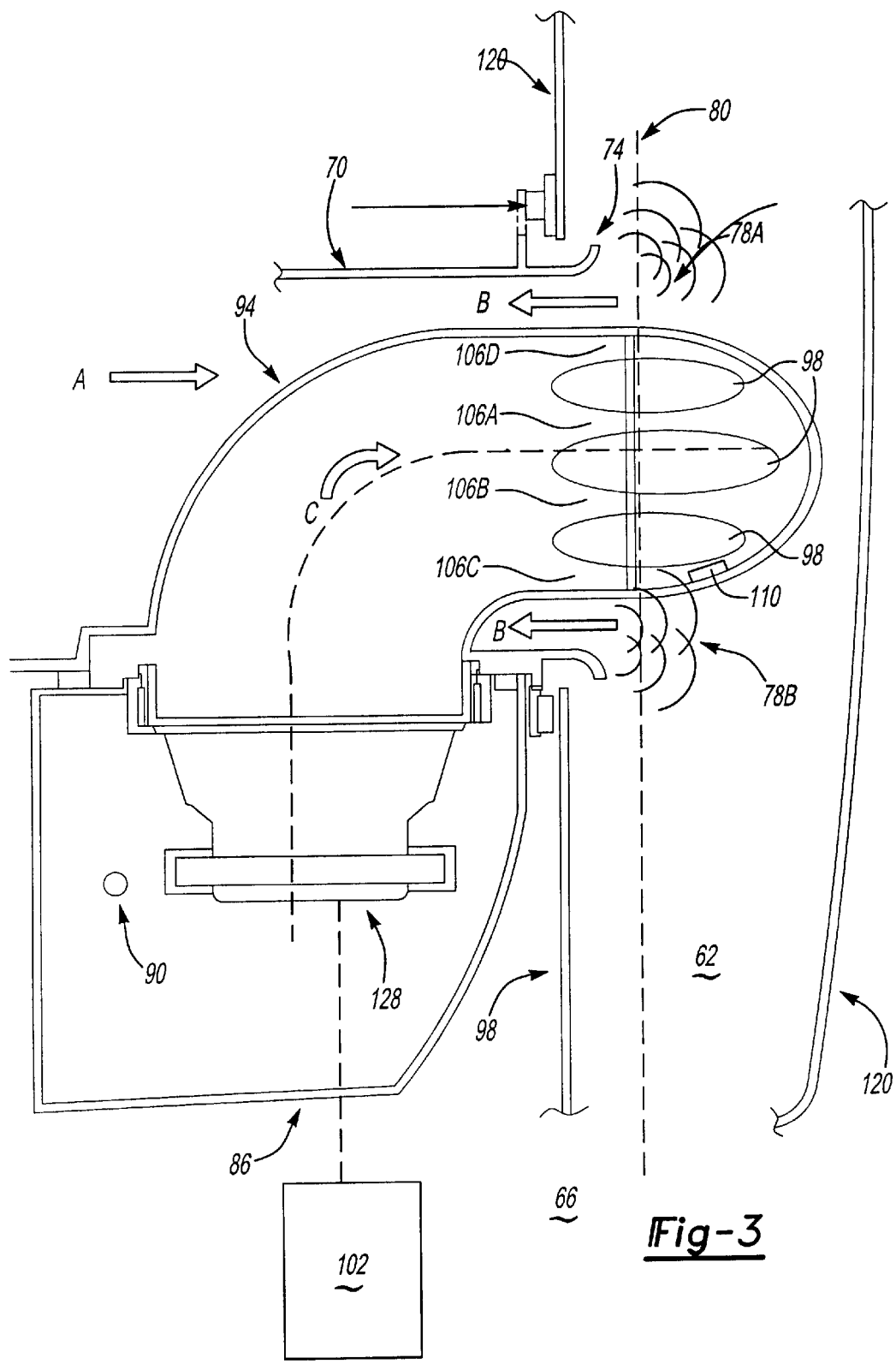
FIG. 3 shows a plan view of another embodiment of the invention.

FIG. 3 shows a plan view of another embodiment of the invention. Fender cavity 62 is shown in relation to engine compartment 66. Air induction body 70 has mouth 74. Engine noise travels through air induction body 70 in the direction of arrow A. Dipole inlets 78A and 78B are formed at mouth 74 to permit air into air induction body 70 in direction of arrow B. This configuration also limits the amount of engine noise emanating from dipole inlets 78A and 78B, thereby improving noise attenuation.

As in the previous embodiment, noise attenuation occurs at interface 80 within fender cavity 62 at least partially covered and protected by fender 120. Speaker 128 generates noise attenuating sound in conjunction with speaker chamber 86 with vented port 90. Control unit 102 drives output of speaker 128.

Figure 4:
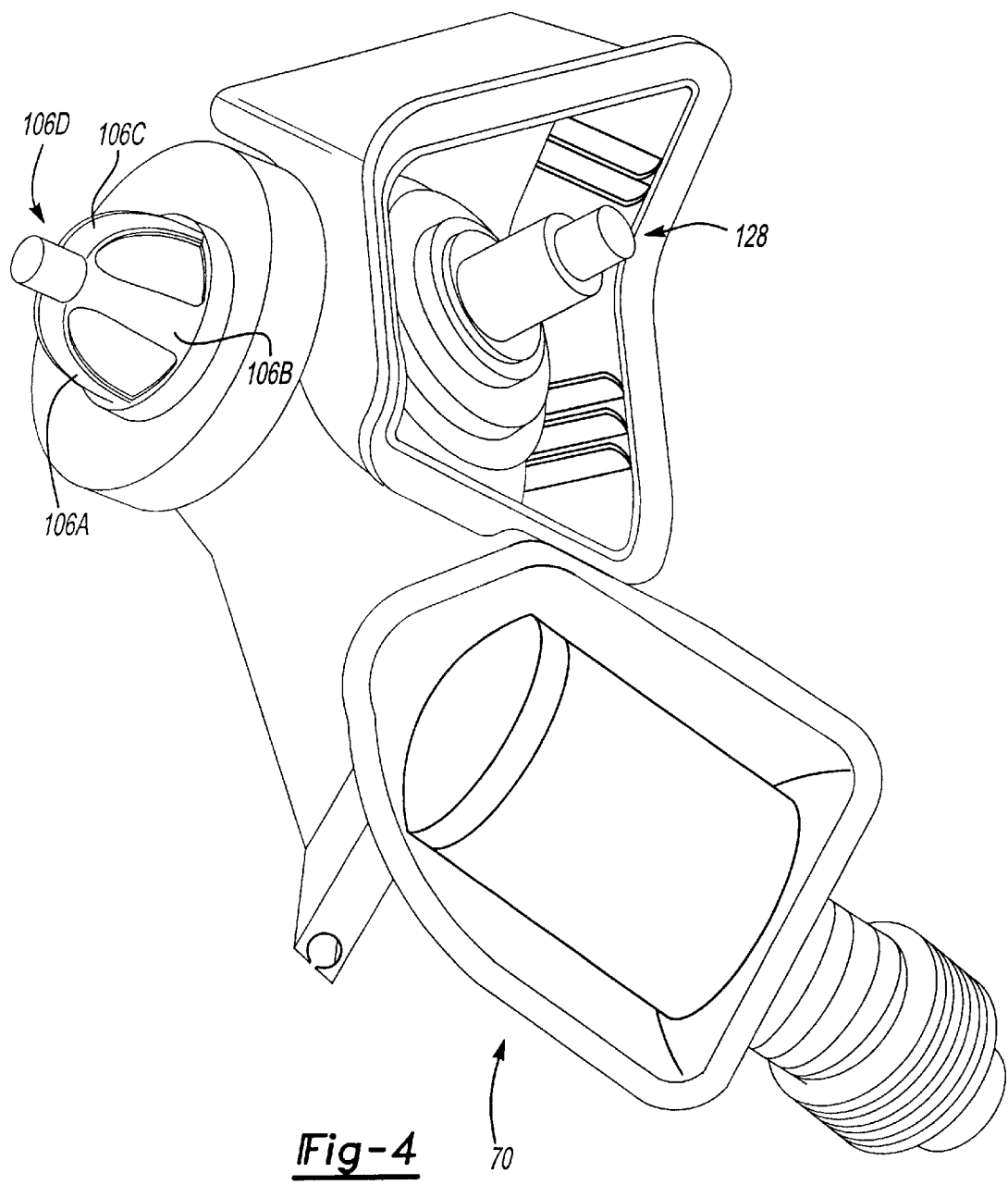
FIG. 4 shows a perspective view the embodiment of FIG. 1 with components exposed.

Wave guide 94 directs noise attenuating sound from speaker 128 to interface 80 along arrow C. Wave guide 94 has a plurality of holes 98 to permit noise attenuating sound from speaker 128 to attenuate engine noise at dipole inlets 78A and 78B. Holes 98 are formed by a plurality of legs, 106A, 106B, 106C and 106D. Leg 106C also rigidly mounts microphone 110 ensuring that speaker 128 and microphone 110 will vibrate together. One of FIG. 4 shows a perspective view of the embodiment of FIG. 3, including speaker 128, legs 106A, 106B, 106C and 106D, and air induction body 70.

Like the embodiment of FIGS. 1 and 2, this particular embodiment serves to protect components such as microphone 110 and speaker 128 from internal and external environmental conditions. Fender 120 serves to isolate speaker 128 from rain, snow, and hostile road conditions as well as wall the face of the speaker from the engine compartment. Placement of microphone 110 in fender cavity 62 serves the same purpose. Thus, the foregoing embodiments place the interface for noise attenuation in the fender cavity, permitting the fender to protect fragile electrical components from the environment.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air induction system comprising:
   an air induction body with a mouth;
   a speaker forming an interface with said mouth;
   a vehicle's fender portion at least partially covering said interface; and
   a control unit in communication with said speaker.

2. The air induction system of claim 1 wherein said interface forms an interface for noise attenuation.

3. The air induction system of claim 1 including a microphone in communication with said control unit.

4. The air induction system of claim 3 wherein said microphone is at least partially covered by said fender portion.

5. The air induction system of claim 3 wherein said microphone is operatively mounted with said speaker.

6. The air induction system of claim 1 including a wave guide at least partially directing a noise attenuating sound from said speaker to said interface.

7. The air induction system of claim 6 wherein said wave guide covers at least a portion of said speaker.

8. The air induction system of claim 6 including a speaker chamber forming an acoustic mass in communication with said speaker.

9. An air induction system comprising:
   an air induction body with a mouth;
   a speaker forming an interface with said mouth;
   a vehicle's fender portion for at least partially covering said interface;
   a control unit in communication with said speaker;
   wherein said interface forms an interface for noise attenuation; and
   wherein said speaker is at least partially disposed outside of said air induction body.

10. An air induction system comprising:
    an air induction body with a mouth;
    a speaker forming an interface with said mouth;
    a vehicle's fender portion for at least partially covering said interface;
    a control unit in communication with said speaker;
    a wave guide for at least partially directing a noise attenuating sound from said speaker to said interface;
    a speaker chamber forming an acoustic mass in communication with said speaker; and
    a venting port on said speaker chamber.

11. An air induction system comprising:
    an air induction body with a mouth;
    a speaker forming a noise attenuation interface with said mouth;
    a dipole inlet formed about said mouth;
    a vehicle's fender portion at least partially covering said noise attenuation interface; and
    a control unit in communication with said speaker.

12. The air induction system of claim 11 including a microphone in communication with said control unit.

13. The air induction system of claim 12 wherein said microphone is at least partially covered by said fender portion.

14. The air induction system of claim 12 wherein said microphone is operatively mounted with said speaker.

15. The air induction system of claim 11 including a wave guide at least partially directing a noise attenuating sound from said speaker to said interface.

16. The air induction system of claim 15 wherein said wave guide covers at least a portion of said speaker.

17. The air induction system of claim 15 including a speaker chamber forming an acoustic mass in communication with said speaker.

18. An air induction system comprising:
    an induction body with a mouth;
    a speaker forming a noise attenuation interface with said mouth;
    a dipole inlet formed about said mouth;
    a vehicle's portion for at least partially covering said noise attenuation interface;
    a control unit in communication with said speaker; and
    wherein said speaker is at least partially disposed outside of said air induction body.

19. An air induction system comprising:
    an air induction body with a mouth;
    a speaker forming a noise attenuation interface with said mouth;
    a dipole inlet formed about said mouth;
    a vehicle's fender portion for at least partially covering said noise attenuation interface;
    a control unit in communication with said speaker;
    a wave guide at least partially directing a noise attenuating sound from said speaker to said interface;
    a speaker chamber forming an acoustic mass in communication with said speaker; and
    a venting port on said speaker chamber.

20. A method of noise attenuation comprising the steps of:
    propagating a noise attenuating sound;
    directing the noise attenuating sound to a noise; and
    causing destructive interference of the sounds at an interface formed between a speaker and the mouth of an air induction body, the interface at least partially covered by a vehicle's fender portion.

* * * * *